United States Patent Office 2,949,482
Patented Aug. 16, 1960

2,949,482

2-NITRO-3,4,6-TRICHLOROPHENYL BENZENESULFONATES

Jacqueline G. Sims, Midland, and Clarence L. Moyle, Clare, Mich., assignors to The Dow Chemical Company, Midland, Mich., a corporation of Delaware No Drawing. Filed Aug. 9, 1957, Ser. No. 677,199

6 Claims. (Cl. 260—456)

The present invention relates to 2-nitro-3,4,6-trichlorophenyl benzenesulfonates corresponding to the general formula

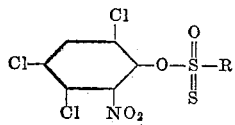

In this and succeeding formulas, R represents an aryl radical. The term "aryl" as herein employed refers to the aromatic radicals of the benzene series whether substituted or unsubstituted with one or more substituents including chlorine, bromine, nitro, cyclohexyl, benzyl, phenyl, lower alkyl or lower alkoxy. The terms "lower alkyl" and and "lower alkoxy" refer to those radicals containing from 1 to 4 carbon atoms, inclusive. These compounds are crystalline solids somewhat soluble in many organic solvents and of low solubility in water. They have been found to be valuable as parasiticides and are adapted to be employed as active toxic constituents of compositions for the control of insects, lamprey, fish and fungi such as *Rhizoctonia solani*. The compounds are also useful as herbicides for the control of the growth of plants.

The new compounds may be prepared by reacting a benzenesulfonyl halide of the formula

R—SO$_2$X wherein X represents a halogen preferably chlorine or bromine with an alkali metal salt of 2-nitro-3,4,6-trichlorophenol. The alkali metal salt employed is preferably the potassium or sodium salt and may be prepared by reacting an excess of potassium hydroxide or sodium hydroxide with the phenol in water or other inert solvent. The reaction between the benzenesulfonyl halide and alkali metal salt is carried out in the presence of an inert solvent such as benzene, carbon tetrachloride or ethylene dichloride and conveniently in the water employed in the preparation of the alkali metal salt. The reaction may be carried out in the presence of a catalytic amount of a catalyst such as sulfuric acid or stannic chloride. Good results are obtained when employing substantially equimolecular proportions of the benzenesulfonyl halide and alkali metal phenolate. The reaction is somewhat exothermic and takes place smoothly at the temperature range of from 0° to 100° C. with the formation of the desired product and alkali metal halide of reaction. The temperature may be controlled by regulating the rate of contacting the reagents and by external cooling.

In carrying out the reaction, the benzenesulfonyl halide and alkali metal phenolate are contacted together in the reaction solvent with stirring and at a temperature of from 0° to 100° C. Upon completion of the reaction, the reaction mixture may be washed with water, and any water-immiscible reaction solvent removed by evaporation to obtain the desired product as a crystalline residue. When the reaction is carried out in water as reaction medium, the desired product precipitates during the course of the reaction and is separated by filtration or decantation. The product may be purified by recrystallization from a suitable organic solvent.

The following examples illustrate the invention but are not to be construed as limiting:

*Example 1.—2-nitro-3,4,6-trichlorophenyl benzenesulfonate*

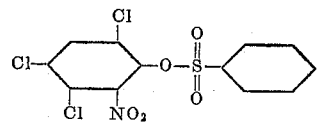

A solution of 22.5 grams (0.412 mole) of potassium hydroxide in 100 milliliters of water was added portionwise with stirring to a solution of 50 grams (0.206 mole) of 2-nitro-3,4,6-trichlorophenol in 50 milliliters of water to produce an aqueous solution of the potassium salt of the corresponding phenol. The addition was carried out over a period of 15 minutes and at a temperature of from 24° to 43° C. Following the addition, the salt solution was diluted with stirring with 150 milliliters of water. Benzenesulfonyl chloride (36.5 grams; 0.206 mole) was added portionwise with stirring to the above prepared solution of potassium 2-nitro-3,4,6-trichlorophenolate. The addition was carried out over a period of 35 minutes and at a temperature of from 24° to 48° C. Following the addition, the reaction mixture was stirred for an additional hour at a temperature of 24° C. and thereafter filtered to separate a 2-nitro-3,4,6-trichlorophenyl benzenesulfonate product as a crystalline residue. This product was washed with water and recrystallized from isopropyl alcohol. The recrystallized product had a melting point of 171°–171.5° C., and a sulfur content of 8.39 percent and a chlorine content of 27.59 percent compared to the calculated values of 8.37 percent and 27.81 percent, respectively.

*Example 2.—2-nitro-3,4,6-trichlorophenyl 2-methylbenzenesulfonate*

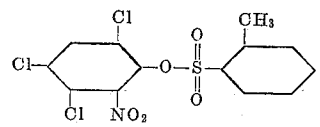

A solution of 22.5 grams (0.412 mole) of potassium hydroxide in 50 milliliters of water was added portionwise with stirring to a solution of 50 grams (0.206 mole) of 2-nitro-3,4,6-trichlorophenol in 150 milliliters of water to produce an aqueous solution of the potassium salt of the corresponding phenol. The addition was carried out over a period of 10 minutes and at a temperature of from 22° to 35° C., and the solution thereafter diluted with 50 milliliters of water. 2-methylbenzenesulfonyl chloride (39.9 grams; 0.206 mole) was added portionwise with stirring to the above-prepared potassium phenolate solution. The addition was carried out over a period of 20 minutes and at a temperature of from 28° to 52° C. The reaction mixture was then stirred for 2 hours at a temperature of from 55° to 60° C., and thereafter filtered to separate a 2-nitro-3,4,6-trichlorophenyl 2-methylbenzenesulfonate product as a yellow solid. This product was successively washed with aqueous 5 percent sodium bicarbonate and water, and the washed product recrystallized from isopropyl alcohol and found to melt at 127.4°–133.3° C.

Example 3.—2-nitro-3,4,6-trichlorophenyl 4-methylbenzenesulfonate

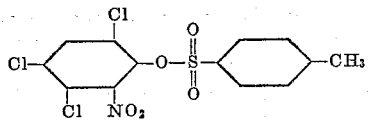

Potassium 2-nitro-3,4,6-trichlorophenolate and 4-methylbenzenesulfonate were reacted together in water as reaction solvent exactly as described in Example 2 to produce a 2-nitro-3,4,6-trichlorophenyl 4-methylbenzenesulfonate product as a white crystalline solid. This product was successively washed with aqueous 5 percent sodium bicarbonate and water, and the washed product recrystallized from isopropyl alcohol. The recrystallized product melted at 152.3°–152.6° C. and was found to contain 26.39 percent chlorine and 8.26 percent sulfur compared to the theoretical values of 26.80 percent and 8.08 percent, respectively.

Example 4.—2-nitro-3,4,6-trichlorophenyl 4-nitrobenzenesulfonate

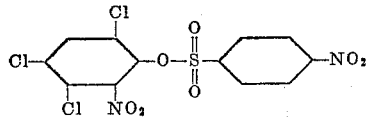

Postassium 2-nitro-3,4,6-trichlorophenolate was prepared by adding portionwise at room temperature a solution of 22.5 grams (0.412 mole) of potassium hydroxide in 50 milliliters of water to a solution of 50 grams (0.206 mole) of 2-nitro-3,4,6-trichlorophenol in 100 milliliters of water. To the potassium salt solution thus formed there was added portionwise at room temperature with stirring 46.5 grams (0.206 mole) of 4-nitrobenzenesulfonyl chloride over a period of 10 minutes. The reaction mixture was then diluted with 50 milliliters of water and the diluted mixture heated with stirring for 90 minutes at a temperature of from 50° to 55° C. Following this period, the reaction mixture was filtered and the crystalline residue washed with aqueous 10 percent sodium bicarbonate and recrystallized from isopropyl alcohol. As a result of these operations, there was obtained a 2-nitro-3,4,6-trichlorophenyl 4-nitrobenzenesulfonate product as a tan solid which had a melting point of 119.5°–120.3° C.

Example 5.—2-nitro-3,4,6-trichlorophenyl 3,4-dichlorobenzenesulfonate

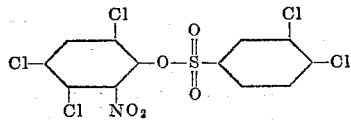

An aqueous solution of potassium 2-nitro-3,4,6-trichlorophenolate was prepared as described in Example 4 by reacting 16.9 grams (0.308 mole) of potassium hydroxide with 50 grams (0.206 mole) of 2-nitro-3,4,6-trichlorophenol in water. To this potassium salt solution was added portionwise with stirring 101.2 grams (0.412 mole) of 3,4-dichlorobenzenesulfonyl chloride over a period of 30 minutes and at a temperature of from 30° to 55° C. Upon completion of the reaction, the reaction mixture was filtered and the crystalline residue successively washed wtih aqueous 10 percent sodium bicarbonate and water and oven dried at 57° C. As a result of these operations, there was obtained a 2-nitro-3,4,6-trichlorophenyl 3,4-dichlorobenzenesulfonate product which melted at 103.6°–104.4° C. and contained 39.18 percent chlorine compared to the calculated value of 39.4 percent.

Example 6.—2-nitro-3,4,6-trichlorophenyl 2,5-dichlorobenzenesulfonate

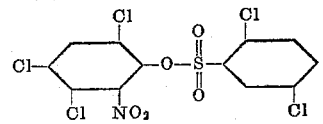

An aqueous solution of potassium 2-nitro-3,4,6-trichlorophenolate was prepared as described in Example 4 by the reaction of 16.9 grams (0.308 mole) of potassium hydroxide and 50 grams (0.206 mole) of 2-nitro-3,4,6-trichlorophenol. To the resulting solution was added portionwise with stirring 101.2 grams (0.412 mole) of 2,5-dichlorobenzenesulfonyl chloride, over a period of 20 minutes and at a temperature of from 24° to 38° C. The reaction mixture was then heated with stirring for 3 hours at a temperature of from 55° to 60° C., and thereafter filtered and the crystalline residue processed as described in Example 5. As a result of these operations, there was obtained a 2-nitro-3,4,6-trichlorophenyl 2,5-dichlorobenzenesulfonate product which melted at 97.8°–98.6° C. and contained 39.37 percent chlorine compared to the calculated value of 39.40 percent.

In a similar manner other 2-nitro-3,4,6-trichlorophenyl benzenesulfonates may be prepared of which the following are representative:

2-nitro-3,4,6-trichlorophenyl 2-methyl-4-chlorobenzenesulfonate by the reaction of 2-nitro-3,4,6-trichlorophenolate and 2-methyl-4-chlorobenzenesulfonyl chloride.

2-nitro-3,4,6-trichlorophenyl 2-chloro-5-nitrobenzensulfonate by the reaction of potassium 2-nitro-3,4,6-trichlorophenyl 2-chloro-5-nitrobenzenesulfonyl bromide.

2-nitro-3,4,6-trichlorophenyl 4-tertiary-butyl benzenesulfonate by the reaction of sodium 2-nitro-3,4,6-trichlorophenolate and 4-tertiary-butyl benzenesulfonyl bromide.

2-nitro-3,4,6-trichlorophenyl 3,5-dinitrobenzenesulfonate by the reaction of potassium 2-nitro-3,4,6-trichlorophenolate and 3,5-dinitrobenzenesulfonyl chloride.

2-nitro-3,4,6-trichlorophenyl 2-methoxybenzenesulfonate by the reaction of potassium 2-nitro-3,4,6-trichlorophenolate and 2-methoxybenzenesulfonyl chloride.

2-nitro-3,4,6-trichlorophenyl 2,4,5-trichlorobenzenesulfonate by the reaction of sodium 2-nitro-3,4,6-trichlorophenolate and 2,4,5-trichlorobenzenesulfonyl bromide.

2-nitro-3,4,6-trichlorophenyl pentachlorobenzenesulfonate by the reaction of potassium 2-nitro-3,4,6-trichlorophenolate and pentachlorobenzenesulfonyl bromide.

2-nitro-3,4,6-trichlorophenyl 2-methyl-4-nitro-benzenesulfonate by the reaction of potassium 2-nitro-3,4,6-trichlorophenolate and 2-methyl-4-nitrobenzenesulfonyl bromide.

2-nitro-3,4,6-trichlorophenyl 2-isopropyl-5-nitrobenzenesulfonate by the reaction of sodium 2-nitro-3,4,6-trichlorophenolate and 2-isopropyl-5-nitrobenzenesulfonyl iodide.

2-nitro-3,4,6-trichlorophenyl 2,3,5-trimethoxybenzenesulfonate by the reaction of sodium 2-nitro-3,4,6-trichlorophenolate and 2,3,5-trimethoxylbenzenesulfonyl chloride.

2-nitro-3,4,6-trichlorophenyl 2-bromo-5-methoxybenzenesulfonate by the reaction of sodium 2-nitro-3,4,6-trichlorophenolate and 2-bromo-5-methoxybenzenesulfonyl chloride.

2-nitro-3,4,6-trichlorophenyl 2-nitro-4-bromobenzenesulfonate by the reaction of potassium 2-nitro-3,4,6-trichlorophenolate and 2-nitro-4-bromobenzenesulfonyl chloride.

2-nitro-3,4,6-trichlorophenyl 4-phenylbenzenesulfonate by the reaction of sodium 2-nitro-3,4,6-trichlorophenolate and 4-phenylbenzenesulfonyl fluoride.

2-nitro-3,4,6-trichlorophenyl 4-cyclohexylbenzenesulfonate by the reaction of sodium 2-nitro-3,4,6-trichlorophenolate and 4-cyclohexylbenzenesulfonyl iodide.

2-nitro-3,4,6-trichlorophenyl 3-benzylbenzenesulfonate by the reaction of potassium 2-nitro-3,4,6-trichlorophenolate and 3-benzylbenzenesulfonyl chloride.

The compounds of the present invention are valuable as herbicides and parasiticides for the control of insects, bacteria and fungi such as *Staphylococcus aureus*, *Erwinia carotovora* and *Penicillium digitatum*. For such use, the compounds may be dispersed on a finely divided solid and employed as dusts. The new products may also be employed in oils, as constituents of aqueous emulsions or aqueous dispersions. In representative operations, good commercial controls of radishes have been obtained when 2-nitro-3,4,6-trichlorophenyl 2,5-dichlorobenzenesulfonate is applied to soil at the rate of 50 pounds per acre.

The benzenesulfonyl halides employed as starting materials in the present invention may be prepared in conventional manner by the reaction of benzenesulfonic acid or a substituted benzenesulfonic acid with an excess of phosphorus pentahalide. In an alternative method of preparation, benzene or a substituted benzene may be reacted with a halosulfonic acid. In either method, the mixture is warmed for a period of time to complete the reaction and the reaction mixture thereafter fractionally distilled under reduced pressure to separate the desired product.

We claim:
1. A 2-nitro-3,4,6-trichlorophenyl benzenesulfonate corresponding to the general formula

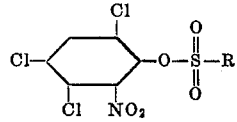

wherein R represents an aryl radical of the benzene series.

2. 2-nitro-3,4,6-trichlorophenyl benzenesulfonate.
3. 2-nitro,3,4,6-trichlorophenyl 4-methylbenzenesulfonate.
4. 2-nitro-3,4,6-trichlorophenyl 4-nitrobenzenesulfonate.
5. 2-nitro-3,4,6-trichlorophenyl 3,4-dichlorobenzenesulfonate.
6. 2-nitro-3,4,6-trichlorophenyl 2,5-dichlorobenzenesulfonate.

References Cited in the file of this patent
UNITED STATES PATENTS

| | | |
|---|---|---|
| 1,646,785 | Duisberg et al. | Oct. 25, 1927 |
| 2,678,878 | Stewart | May 18, 1954 |

FOREIGN PATENTS

| | | |
|---|---|---|
| 821,551 | France | Dec. 8, 1937 |

OTHER REFERENCES

Drahowzal et al.: Monatshefte für Chemie, vol. 82, pp. 452–459 (1951).